Patented Oct. 16, 1934

1,977,250

UNITED STATES PATENT OFFICE 1,977,250

VAT DYESTUFF PASTE

Otto Stallmann, South Milwaukee, Wis., assignor to E. I. du Pont de Nemours & Company, Wilmington, Del., a corporation of Delaware No Drawing. Application May 12, 1933, Serial No. 670,745

11 Claims. (Cl. 8—6)

This invention relates to vat dyestuff pastes. It is an object of this invention to provide an improved vat dyestuff paste which is particularly adapted for incorporation into printing pastes, and which when so used is characterized by great tinctorial strength and produces brilliant prints upon fabric. Other and further important objects of this invention will appear as the description proceeds.

In copending application of Ivan Gubelmann, Ser. No. 556,937, it has been disclosed that when water-soluble reaction products of dichlorhydrin and ammonia are incorporated into vat dyestuffs, they have a remarkable and beneficial effect upon their adaptability for use in printing pastes. In general, said resultant printing pastes acquire increased tinctorial strength and produce more brilliant prints as compared to the said dyestuffs when used without these novel assistants.

I have now found that equally good results, and in many cases, superior results are obtained if instead of the reaction product of dichlorhydrin and ammonia, one uses the water-soluble reaction products of epichlorhydrin and ammonia.

The chemical nature of the last mentioned reaction products is not clearly understood. Very likely they are mixtures of several related compounds, some of which are probably present also in the reaction product of dichlorhydrin and ammonia. The entire composition is, however, different, and exhibits a distinct superiority over the Gubelmann assistant for the purpose mentioned. Moreover, it seems that the nature of the compounds constituting the reaction product is influenced by the circumstance whether the reaction is effected in a concentrated zone or in a highly dilute zone. An analogous variance in composition depending on the dilution of the reaction zone was observed in the case of the dichlorhydrin-ammonia reaction by Claus (Annalen 168, pages 29–42). I found that the reaction product produced in a dilute zone is far superior for the purpose mentioned to that produced in a concentrated zone, and is apparently a novel compound or composition of matter. Nevertheless the products produced in a concentrated zone are also valuable for the purpose set forth and form an integral part of this invention.

My novel printing assistants may be mixed with the dyestuff prior to the latter's incorporation into the usual thickening and reducing mixture which go to make up the printing paste, or they may be added directly to the printing paste either during or after the incorporation of the dyestuff.

The proportions of my novel assistants to be added may be varied within wide limits. In general, 5 to 70% by weight of the (aqueous) dyestuff paste, or 50 to 700% by weight of the dyestuff will produce beneficial results. These limits, however, may be exceeded if desired without detrimentally affecting the action of the assistant. The optimum proportions appear to lie within the range of 30–50% by weight of the aqueous dyestuff paste. This is particularly true in the case of vat dyestuffs of the indanthrone series.

Without limiting my invention to any specific procedure, the following examples are given to illustrate my preferred mode of carrying out the same. Parts given are parts by weight.

A. PREPARATION OF THE PRINTING ASSISTANTS

Example 1

92 parts of epichlorohydrin are dissolved in 736 parts of denatured technical ethyl alcohol and the solution is heated to 60–70° C. The mass is then kept agitating at 60–70° C. for a total of 20–30 hours, while a slow stream of dry ammonia gas is allowed to pass over the surface of the reaction mass. The ammonium chloride, which has precipitated out during this period, is now filtered off and the filtrate is treated at 65–70° C. with a 10% alcoholic caustic soda solution until the mass is distinctly alkaline to thymol phthaleine paper. About one-half of the alcohol is now distilled off, together with any excess of ammonia, and cooled to room temperature and filtered from the precipitated sodium chloride. The filtrate is evaporated to dryness, the final stages being carried out under vacuum at about 100° C. The residue, which is practically pure assistant, is made up to a viscous liquid by the addition of water to about 20% of its weight, and can be stored in this condition indefinitely.

The constitution of the novel product is not known definitely, but it most probably consists predominantly, if not exclusively, of a compound of the formula:

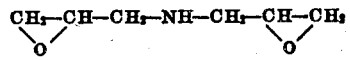

or a polymerized product thereof which may be called diepihydrin-amine.

Example 2

The procedure is carried out exactly as described in Example 1, except that absolute methyl alcohol is used as solvent instead of the technical denatured ethyl alcohol. The end product is identical with the product of Example 1.

Example 3

92 parts of epichlorohydrin are dissolved in 368 parts of absolute, denatured ethyl alcohol and the solution is heated to 50–55° C. There is then added at this temperature, under agitation, a solution of 41 parts of ammonia gas in 368 parts of absolute alcohol. This solution is dropped in slowly and uniformly within a period of 4–6 hours. The mass is then stirred for another 30–40 hours at 50–55° C. and the clear solution is poured off into another vessel, leaving behind about 26 parts of ammonium chloride. The clear solution is then treated with about 155 parts of a 22% sodium alcoholate solution to render the reaction mass distinctly and permanently alkaline to thymol phthaleine paper. About one-half of the alcohol and the excess ammonia is now distilled off from the mass, which is then cooled to room temperature and filtered. The filtrate is evaporated to dryness, in the final stages under vacuum at 100° C., and the residue is stirred up into a viscous liquid by the addition of 20% of its weight of hot water.

Example 4

92 parts of epichlorohydrin and 736 parts of denatured technical alcohol are treated with ammonia gas at 60–70° C. as described in Example 1. At the end of the 20–30 hours period there are then added, without filtering off the precipitated ammonium chloride, a total of about 400 parts of a 10% alcoholic caustic soda solution until the mass is distinctly and permanently alkaline to thymol phthaleine paper. About one-half of the alcohol and the excess ammonia are now distilled off, the residual mass is filtered and the filtrate evaporated to dryness, finally under vacuum at 100° C. The reaction product thus obtained is stirred up with 20% of its weight of water to a syrup-like liquid.

The products obtained according to the above four examples appear to be identically the same and contain on the average about 12–15% organic bound nitrogen on the dry basis and are free of organic bound chlorine. When technical denatured ethyl alcohol of about 94% strength is used in the preparation, as for instance in Examples 1 and 4, the product usually contains a small amount (2–4%) of sodium chloride.

Example 5

92 parts epichlorohydrin and 460 parts technical, denatured ethyl alcohol are heated to 65° C. There are then added slowly over a period of 2 hours at 65° C. a solution of 17 parts ammonia (100%) in 300 parts alcohol.

The mass is kept stirring at 65° C. for 15 hours and there are then added at 65° C. about 400 parts of a 10% alcoholic caustic soda solution, until the mass is distinctly alkaline to thymol phthaleine paper. The mass is cooled to room temperature, filtered and the filtrate is evaporated to dryness, finally under vacuum at about 100° C.

Example 6

92 parts of epichlorohydrin and 736 parts of absolute denatured ethyl alcohol are heated to 60–65° C. There are added at this temperature under agitation over a period of 2–3 hours about 43 parts of sodamide (NaNH$_2$), until finally a permanent, distinct alkalinity test is obtained on thymol phthaleine paper. The mass is then heated to reflux for ½ hour, then cooled to room temperature and filtered. The filtrate is evaporated to dryness, finally at 100° C. under vacuum, and the residue is made up to a syrup-like liquid with about 20% of its weight of water. The product thus obtained has good printing assistant properties and appears to be substantially identical with the product of Examples 1 to 4.

In the preceding examples the printing assistant was isolated in the form of the free base. For use in certain printing pastes, however, it has been found to be more expedient to employ the hydrochloride or other salts. These may be prepared and isolated as illustrated in the following examples.

Example 7

The procedure is carried out exactly as in Example 3, including the drying of the reaction product under vacuum at 100° C. There are then stirred into the strongly alkaline, semi-solid residue about 60 parts of hydrochloric acid (20° Bé.), until the mass is but very slightly alkaline to brilliant yellow paper. The clear solution, thus obtained, may then be evaporated under vacuum to any desired viscosity. For practical reasons it is best to carry the evaporation until a syrup-like liquid, consisting of about 75% non-volatile material and 25% water is obtained. Such a composition is most suitable for use in printing pastes, since it dissolves readily in the color paste, without causing coagulation and possesses the additional desirable property of lowering the viscosity of the printing paste.

Example 8

92 parts epichlorohydrin and 736 parts technical denatured ethyl alcohol are treated with ammonia gas as described in Example 1 for 24 hours at 65° C. The mass is then cooled to room temperature and filtered. The filtrate is evaporated to a total residue of about 150 grams, which is cooled to room temperature. The clear solution is then poured off from some insoluble, gummy material and evaporated at about 50–70° C. under vacuum to dryness. The residue is stirred up with hot water to a 75% syrup-like liquid, which appears to be identical with the end product obtained according to Example 7.

Example 9

92 parts epichlorohydrin and 400 parts water are heated to 65–70° C. There are then added at 65–70° C. slowly within a period of 1½–2 hours 40 parts of a 28% ammonia-water solution, keeping the mass under vigorous agitation. At the end of this period, the epichlorohydrin oil layer disappears and a clear solution is obtained, which is heated to 95° C. and kept at this temperature for 1 hour. It is then distilled in vacuo to dryness at a final temperature of about 100° C. The residue is stirred up with about 20% of its weight of water to a syrup-like solution, which appears to be identical with the product obtained according to Example 8, except that it contains some ammonium chloride in solution.

Example 10

The procedure is carried out as described in Example 7, except that in lieu of hydrochloric acid, about 49 parts of phosphoric acid are used or sufficient to neutralize the strongly alkaline base to a very slight alkalinity to brilliant yellow paper. The end product is the phosphate of the new assistant, which is generally similar in properties to the corresponding hydrochloride obtained in Example 7.

Example 11

The procedure is the same as described in Example 7, except that in lieu of hydrochloric acid, about 144 parts of the beta-anthraquinone-sulfonic acid are used for neutralization, producing the anthraquinone-beta-sulfonic acid salt of the new assistant.

Numerous variations are possible in the method of preparing the novel assistants, as will be readily understood by those skilled in the art.

Thus, in the amidation step the temperature may be lowered under 50° C., allowing a longer reaction time for completion of the reaction, or again a higher temperature, for instance, reflux temperature (75-80° C.) may be employed for a shorter time. It has been found, however, that higher temperatures at this stage of the reaction favor the formation of a gummy by-product which is insoluble in alcohol and water, and consequently lower the yield of usable assistant.

In the step of basing the hydrochlorides with a suitable alkali, the temperature at which this reaction is carried out may be chosen at will. 60-70° C. was preferred in the above examples because at this temperature the sodium chloride is formed in large crystals which will settle and can be filtered off readily. Aside from this point, however, any other temperature may be used. Other alkalies, such as potassium hydroxide or such sodium or potassium salts which act like caustic in alcoholic solution may be employed, as for instance sodamide (NaNH$_2$).

The amidation step may be combined with the caustic treatment in one reaction, as shown, for instance, in Example 6 above.

The amounts of alcohol or water used may be varied within wide limits, and other solvents such as methyl, propyl, or butyl alcohol may be used.

Instead of using pure, distilled epichlorohydrin, the crude, wet product obtained from crude dichlorohydrin and lime may be used successfully.

The reaction products obtained according to Examples 1-11 above are highly hygroscopic syrup-like masses, which solidify to resin-like products when cold and completely dry. They are readily soluble in water and alcohol in all proportions. The solution of the bases in water reacts very strongly alkaline, almost as strongly as dilute caustic soda solution (pH value=about 12), whereas the salts of the amine bases are practically neutral. The hydrochlorides are in all cases very similar in physical properties to the corresponding bases. In application, according to this invention, the products may be mixed with the dyestuff paste prior to the latter's incorporation into the usual thickening and reducing mixture, or they may be added directly to the printing paste either during or after the incorporation of the dyestuff.

B. Preparation of the Dyestuff Paste

Example 12

100 parts of anthrene blue RS (Color Index No. 1106) (10% paste) are mixed with 30 parts of the product of Examples 1 to 4 and the mixture is evaporated slowly at about 60-70° C., until its total weight is reduced to 100 parts. The resultant paste, when incorporated into the usual potash-formopon paste and printed upon cotton fabric, exhibits great tinctorial strength and gives prints of exceptional brilliance.

Example 13

50 parts of a press cake as obtained in the technical commercial manufacture of the halogenated indanthrone according to Examples 1 to 4 of U. S. Patent 1,862,843 and containing 20% by weight of the dyestuff are mixed with 40 parts by weight of any one of the products obtained in Examples 1 to 11. The resulting color paste, which may be milled to a smooth paste, is incorporated with the usual thickening and reducing agents and yields then upon cotton prints of greatly enhanced strength and brilliancy in comparison with the prints obtained by using the same dyestuff but without the novel assistants.

Example 14

The dyestuff paste is prepared as described in Example 13 except that a press cake containing 20% by weight of 3,3'-dibromo-indanthrone is used instead of the product of U. S. Patent 1,862,843.

The resulting color paste, containing about 30-50% of any one of the products of Examples 1-11, is then incorporated with the usual thickening and reducing agents and yields upon cotton comparatively strong and bright prints, whereas a dibromo-indanthrone printing paste prepared without the novel assistants is much less suitable for printing purposes.

The thickening and reducing paste mentioned in the above examples may be prepared in the usual manner, and may contain the usual ingredients in any of the usual proportions and with any further assistants and dispersing agents which are commonly employed in this art. A typical composition and mode of preparation of the final printing paste is illustrated in the following example:

Example 15

Preparation of the printing paste:

25 parts of British gum, 5 parts of corn starch and 30 parts of cold water are mixed together into a smooth paste at about 70-80° C. 16 parts of potassium carbonate are now added; the mixture is stirred, cooled to about 60° C. and 16 parts of powdered sodium-formaldehyde-sulfoxylate are added. The mixture is further stirred and cooled and 8 parts of glycerine are added. Finally, 50 parts of the dyestuff mixtures as prepared in Examples 12-14 are added. The resultant pastes, when printed upon cotton fabric and developed in the usual manner, yield blue prints of exceptional brilliance and improved tinctorial strength.

The exact formula of my new compounds is not known although they are believed to be secondary amines having the formula as above given or polymerization products thereof. Wherever in the specification or claims of this application formulæ are given, it is to be understood that such formulæ are merely representative of the possible structure of these compounds, based on the manner in which they are synthesized and on the chlorine and nitrogen analysis of such products and such formulæ are not to be used as limitations upon the scope of my invention. Furthermore, in the specification or claims, where the compounds are referred to by name, such as diepihydrin-amine and epichlorhydrin-amine or similar expression, these terms are used to cover the compounds obtainable by the process herein described, and are not to be limited by particular formulæ.

It will be understood that many variations are possible in the procedure above set forth without departing from the spirit of this invention.

I claim:

1. A printing paste comprising a vat dyestuff and a water soluble compound obtainable by reacting epichlorhydrin and ammonia, said compound being free of organic bound chlorine.

2. A printing paste comprising a vat dyestuff of the halogenated indanthrone series and a salt of the base obtainable by reacting epichlorhydrin and ammonia in a zone of high dilution.

3. A dyestuff paste comprising a dihalogen-indanthrone and diepihydrin-amine.

4. A dyestuff paste comprising a dihalogen-indanthrone and a salt of diepihydrin-amine.

5. A dyestuff paste comprising a 3,3'-dihalogen-indanthrone and diepihydrin-amine-hydrochloride.

6. A dyestuff paste comprising a vat dyestuff of the indanthrone series and a printing assistant selected from the group consisting of the water-soluble reaction products of epichlorhydrin and ammonia and their salts, the ratio of assistant to dyestuff being between 50:100 and 700:100 on the dry basis.

7. A dyestuff paste comprising a vat dyestuff of the halogenated indanthrone series and a printing assistant selected from the group consisting of the water-soluble reaction products of epichlorhydrin and ammonia and their salts, the ratio of assistant to dyestuff being between 300 and 700 to 100 on the dry basis.

8. The process of improving the printing qualities of a vat dyestuff which comprises incorporating into the same a water-soluble compound obtainable by reacting epichlorhydrin and ammonia in a dilute reaction zone.

9. The process of improving the printing qualities of a printing paste comprising a dihalogen-indanthrone which comprises incorporating into the same for each part of the dyestuff from 3 to 5 parts of diepihydrin-amine or a salt thereof.

10. The process of printing cotton fabric which comprises applying thereto a printing paste comprising a vat dyestuff of the indanthrone series and the product obtainable by reacting epichlorhydrin and ammonia in a dilute reaction zone.

11. The process of printing cotton fabric which comprises applying thereto a printing paste comprising a 3,3'-dihalogen-indanthrone and an assistant selected from the group consisting of diepihydrin-amine and its salts.

OTTO STALLMANN.